United States Patent Office 3,539,258
Patented Nov. 10, 1970

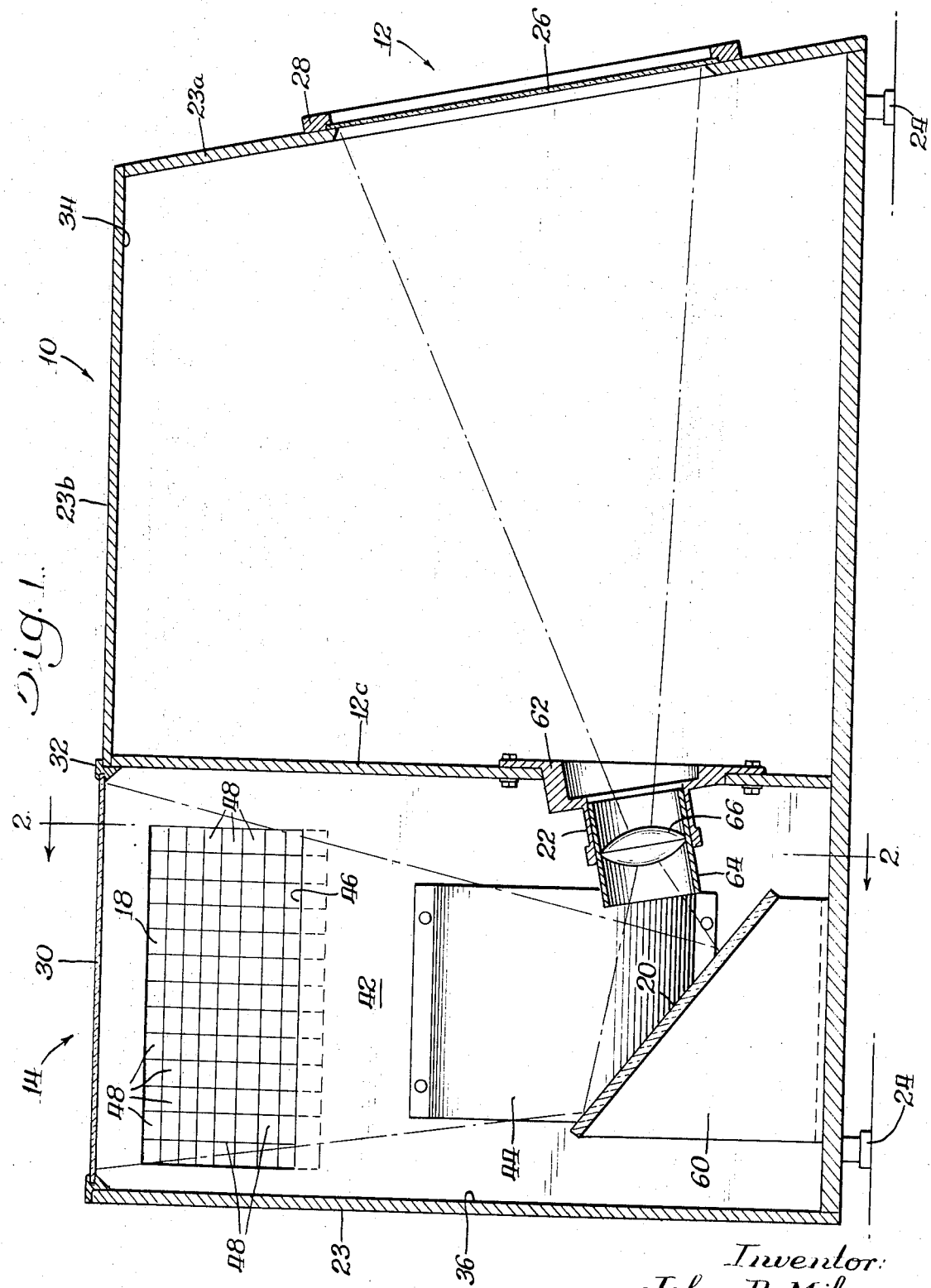

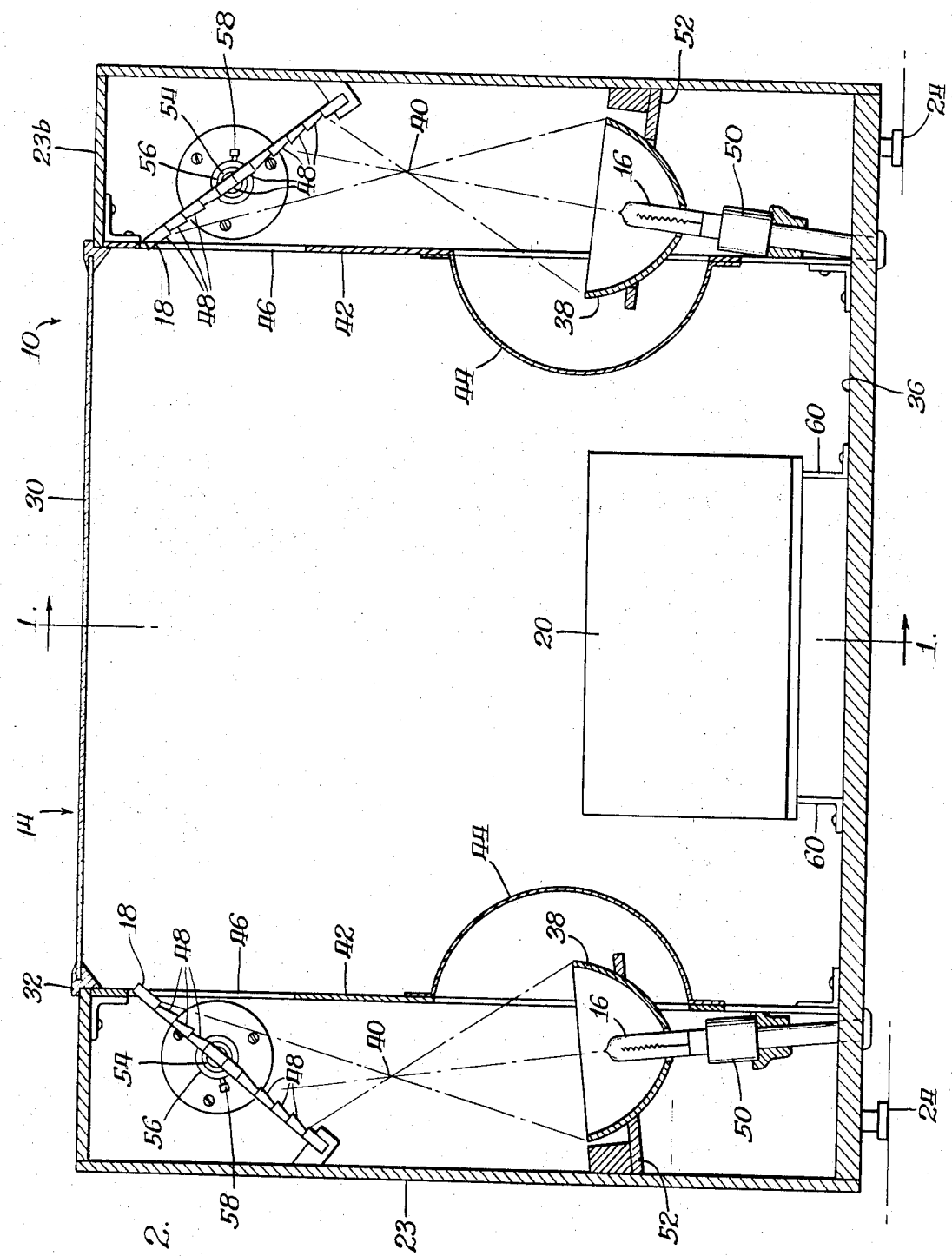

3,539,258
OPTICAL APPARATUS FOR DOCUMENT COPIER
John R. Miles, Glenview, Ill., assignor to Addressograph-Multigraph Corporation, Mount Prospect, Ill., a corporation of Delaware
Filed Jan. 10, 1968, Ser. No. 696,846
Int. Cl. G03b 27/70
U.S. Cl. 355—70       4 Claims

ABSTRACT OF THE DISCLOSURE

An optical assembly exposes a light sensitive member with a light image produced by illumination of an original. A pair of lamps provide light which is reflected against the original by a pair of lenticular reflective members each including several small mirror surfaces arranged to illuminate the original evenly by directing relatively more light upon the edge areas of the original. Ellipsoidal reflectors focus the light from the lamps at a region between the lamps and the reflective surfaces. Baffles prevent light from traveling directly from the lamps onto the original. The light image from the original is reflected by a mirror through a lens and is focused on the light sensitive member.

BACKGROUND OF THE INVENTION

The present invention relates to optical apparatus and more particularly to improved apparatus for illuminating an original and exposing a light sensitive member with the light image produced.

In known copying operations an original, such as a graphic original sheet or the like, is illuminated, and a light image of the original is produced as light is absorbed by dark areas of the original and reflected by light areas of the original. The light image is projected against a light sensitive member, such as a sheet of photosensitive material of a desired type, in order to produce a copy of the original.

SUMMARY OF THE INVENTION

One object of the present invention is to provide improved optical apparatus.

Another object is to provide an improved assembly for illuminating an original to produce a reflected light image thereof.

A further object is to provide improved apparatus for illuminating an original in a uniform manner to produce a light image of uniform and even intensity.

A further object is to provide optical apparatus characterized by compact construction and efficient use of light.

In brief, the above and other objects and advantages are achieved in one embodiment of the invention by the provision of an optical assembly including a housing for supporting an original and a light sensitive member. A pair of light sources are provided for illumination of the original, and light is reflected from the sources onto the original by reflective members comprising lenticular mirrors constructed and arranged to decrease the relative amount of light striking the central portion of the original, thereby to produce a light image of even, uniform intensity.

In accordance with the features of the present invention, an ellipsoidal reflector is used with each light source for focusing the light from the source at a region between the light source and the reflective member, thereby efficiently utilize the available light and to minimize undesirable dispersion of light. In addition, baffle members are provided between the light sources and the original for preventing light from traveling directly from the sources onto the original.

BRIEF DESCRIPTION OF THE DRAWINGS

FIG. 1 is a sectional view of an optical apparatus constructed in accordance with the present invention, taken along the line 1—1 of FIG. 2; and
FIG. 2 is a sectional view of the apparatus of FIG. 1 taken along the line 2—2 of FIG. 1, with the lens assembly omitted for clarity.

DESCRIPTION OF THE ILLUSTRATED EMBODIMENT

Having reference now to the drawings, there is illustrated an optical apparatus designated as a whole by the reference numeral 10 and constructed in accordance with the principles of the present invention. The apparatus 10 serves to expose a light sensitive member supported at an exposure station generally designated as 12 (FIG. 1) with a light image produced by illumination of an original supported at an illumination station generally designated as 14 (FIGS. 1 and 2). In general, the apparatus 10 includes a pair of lamps 16 serving as the source of light which is directed onto the original by a pair of reflective members 18 thereby to illuminate the original. The light image reflected from the original is projected onto the light sensitive member by a mirror 20 and a lens assembly 22 (FIG. 1).

More specifically, the apparatus 10 includes a compact housing 23 formed of metal or other opaque material and provided with feel 24 for supporting the apparatus upon a suitable surface. The exposure station 12 includes a glass plate or platen 26 held over an aperture in an inclined side wall 23a of the housing 23 by a frame 28. The platen 26 serves to support any suitable light sensitive sheet material such as sensitized paper or the like in position to be exposed by a light image reflected from the original. The illuminating station 14 includes a glass plate or platen 30 held over an aperture in a top wall 23b of the housing by a frame 32. The platen 30 supports an original sheet in position to be illuminated and copied. An interior wall 12c of the housing divides the housing into an exposure chamber 34 adjacent the exposure station 12 and an illuminating chamber 36 adjacent the illuminating station 14.

In accordance with important features of the present invention, there is provided novel structure for illuminating the original. When an original is illuminated directly from a source of light such as a lamp, several problems arise. One difficulty is that the central portion of the original is illuminated more intensely than the edge area, principly due to the fact that the light travels a shorter distance from the lamp to reach the central regions and thus is effectively brighter than the light traveling to the edge areas. In addition, in such arrangements the light is used quite inefficiently because only a fraction of the total light output is utilized in illumination of the original. Another problem which arises when the original is supported on a glass platen is that the bright lamp filament or the like can be reflected from the surface of the glass platen onto the light sensitive member and cause over-exposure of one portion.

In order to accomplish efficient use of the light produced by the lamps 16, each lamp is surrounded by a reflector 38 serving to focus the light from the respective lamp 16 at a region, designated as 40, intermediate the lamp 16 and the respective reflecting member 18. The reflectors 38 are ellipsoidal in shape and produce a concentrated light beam which converges toward the region 40 and then expands until it strikes the reflective members 18. In this manner it is assured that the light produced by the lamps 16 is efficiently utilized to illuminate the original.

In the improved apparatus of the present invention, the problem of reflection of the bright filaments of the lamps onto the light sensitive means is avoided. The reflecting members 18 are disposed at the sides of the illumination station 14, and at an oblique angle to the glass platen 30. As a result, any reflection of the filaments from the members 18 onto the platen 30 will not be reflected or projected toward the exposure station 12. In accordance with the present invention, light is prevented from traveling directly from the lamps 16 toward the illumination station 14 by the provision of a pair of baffle walls 42 each including a cylindrical projection 44 accommodating the lamp reflectors 38. Each baffle wall includes an aperture 46 allowing the original to be illuminated only by light reflected from the reflecting members 18, but not directly from the lamps 16. Accordingly, an image of the lamp filaments cannot be reflected by the glass platen 30 onto the light sensitive member causing an area of over-exposure or "burnout."

In order to overcome the problem of over-illumination of the central portions of the original, the reflecting members 18 have lenticular characteristics in that they are constructed and arranged to direct relatively more light toward the edges of the original than toward the center. Each reflecting member 18 includes many small, flat mirror surfaces 48 angularly disposed with respect to one another. The individual surfaces are arranged in such a way that the concentrated light beam from the lamps 16 and reflectors 38 is realigned or distributed to compensate for the tendency to over-expose the central region of the original. As a result, the light image produced by illumination of the original is of even and uniform intensity from edge to edge.

Proceeding now to a more detailed description of the construction of the apparatus 10, the lamps 16 are illustrated as comprising tubular incandescent lamps, but it should be understood that other types may be used if desired. The lamps are disposed at opposite sides of the illuminating chamber 36 behind the baffle walls 42 and are mounted in suitable sockets 50. The reflectors 38 may be formed of any desired reflecting material, and are supported by means of brackets or frames 52 supported on opposite sides walls of the housing 12.

In order to enable the lenticular reflecting members 18 to be adjusted to evenly illuminate the originals, each member 18 is supported on a shaft 54. The shafts 54 are rotatably journaled in housings 56, and may be locked in a selected position by means of thumb screws 58 or the like.

Light striking the original at the illuminating station 14 is reflected by lighter areas of the original and is absorbed by darker areas of the original. The light image so produced is reflected downwardly from the illuminating station 14 toward the flat mirror 20. The mirror 20 is supported at an angle within the illuminating chamber 36 by a pair of brackets 60 secured to the floor of the housing. The mirror 20 permits the apparatus 10 to be quite compact in arrangement, since it reflects the light image from the original at an angle from the illuminating chamber 36 through the lens assembly 22 and into the exposure chamber 34.

The lens assembly 22 (FIG. 1) is supported by a housing 62 carried by the internal wall 23c of the housing. A lens barrel 64 supports a suitable lens element 66 serving to focus the light image of the original onto the light sensitive member supported at the exposure station 12.

While the present invention has been described with reference to the details of one embodiment thereof, numerous other modifications and embodiments may be devised by those skilled in the art. Accordingly, it should be understood that details of the described embodiment do not limit the invention except as set forth in the following claims.

What is claimed and desired to be protected by Letters Patent of the United States is:

1. Optical apparatus for illuminating an original to produce a light image for exposure of a light sensitive member, said apparatus comprising in combination a housing including an illuminating chamber having a first wall carrying a lens for projecting the light image from the illuminating chamber onto the light sensitive member, a second wall of said illuminating chamber oriented generally transverse of said first wall and including original supporting means defining an illumination area for the original to be illuminated, an exposure mirror supported within said chamber for reflecting the light image from the illumination area toward said lens, third and fourth walls generally transverse to said first and second walls and providing a pair of compartments at opposite sides of said illuminating chamber, one of said compartments being disposed at each side of the illumination area, a light source in each of said compartments, an aperture in each of said second and third walls adjacent opposite sides of the illumination area and offset from straight lines extending from said light sources to the illumination area so that the third and fourth walls prevent direct illumination of the illumination area, a pair of illumination mirrors each supported within one of said compartments adjacent said apertures for reflecting light from the corresponding light source through the aperture and onto said illumination area, and a reflector mounted adjacent each said light source for directing substantially all of the light from the light source onto the corresponding illumination mirror.

2. The apparatus of claim 1, said illumination mirrors comprising reflective means constructed and arranged to decrease the amount of light reflected onto the central region of the exposure area relative to the edge portions.

3. The apparatus of claim 1, each said reflector comprising an ellipsoidal reflector focusing light at a point between the corresponding light source and illumination mirror.

4. The assembly of claim 2, said reflective means each comprising a plurality of adjacent mirror surfaces disposed at angles with respect to one another.

References Cited

UNITED STATES PATENTS

| 2,985,062 | 5/1961 | Clapp. | |
| 3,028,483 | 4/1962 | Simmon. | |
| 3,146,661 | 9/1964 | Young. | |
| 3,263,584 | 8/1966 | Knus. | |
| 3,272,066 | 9/1966 | Rice | 355—70 |
| 3,272,067 | 9/1966 | White | 355—67 |
| 3,272,068 | 9/1966 | Couture | 355—70 |
| 3,312,143 | 4/1967 | Karow et al. | 355—70 |
| 3,316,804 | 5/1967 | Weisglass | 355—67 |
| 3,428,397 | 2/1969 | Elmer. | |

NORTON ANSHER, Primary Examiner

D. J. CLEMENT, Assistant Examiner

U.S. Cl. X.R.

355—66